United States Patent
Ahmed et al.

(10) Patent No.: US 10,015,189 B2
(45) Date of Patent: *Jul. 3, 2018

(54) DETECTING AND PREDICTING CYBER-ATTACK PHASES IN ADJACENT DATA PROCESSING ENVIRONMENT REGIONS

(71) Applicant: International Business Machines Corporation, Armonk, NY (US)

(72) Inventors: Mohamed N. Ahmed, Leesburg, VA (US); Aaron K. Baughman, Silver Spring, MD (US); Nicholas A. McCrory, Sacramento, CA (US); Andeep S. Toor, Chantilly, VA (US); Michelle Welcks, Tampa, FL (US)

(73) Assignee: INTERNATIONAL BUSINESS MACHINE CORPORATION, Armonk, NY (US)

( * ) Notice: Subject to any disclaimer, the term of this patent is extended or adjusted under 35 U.S.C. 154(b) by 314 days.

This patent is subject to a terminal disclaimer.

(21) Appl. No.: 15/019,352

(22) Filed: Feb. 9, 2016

(65) Prior Publication Data

US 2017/0230409 A1 Aug. 10, 2017

(51) Int. Cl.
*H01L 29/06* (2006.01)
*H04L 29/06* (2006.01)
*G06F 17/30* (2006.01)

(52) U.S. Cl.
CPC .... *H04L 63/1441* (2013.01); *G06F 17/30312* (2013.01); *H04L 63/1425* (2013.01)

(58) Field of Classification Search
CPC ......... G06F 17/30312; G06F 17/30598; G06F 21/55–21/554; G06F 21/56;

(Continued)

(56) References Cited

U.S. PATENT DOCUMENTS 6,785,592 B1  8/2004  Smith et al.
8,274,377 B2  9/2012  Smith et al.
(Continued)

FOREIGN PATENT DOCUMENTS

CA     2337798 A1   1/2000
CN   102638445 B    3/2015
(Continued)

OTHER PUBLICATIONS

Appendix P, 2017.
(Continued)

*Primary Examiner* — Kevin Bechtel
(74) *Attorney, Agent, or Firm* — Garg Law Firm, PLLC; Rakesh Garg; Chistopher K. McLane

(57) ABSTRACT

A set and a second set of collections of forecasted feature vectors are selected from a repository for a future time window, a cyber-attack being in progress in a data processing environment at the present time, a collection in the set and a collection in the second set indicating an event related to the cyber-attack in a first region and a second event in a second region, respectively, of the environment at a discrete time. The set of collections is input at a first input and the second set of collections is input at a second input in the LSTM. The events corresponding to the collections are classified into a class of cyber-attack. From a mapping between a set of phases of the cyber-attack and a set of classes, a phase that corresponds to the class is predicted as likely to occur during the future time window in the region.

18 Claims, 7 Drawing Sheets

(58) Field of Classification Search
CPC ..... G06F 21/566; G06F 21/577; H04L 63/14; H04L 63/1408–63/1425; H04L 63/1441–63/1483; H04L 63/20
See application file for complete search history.

(56) References Cited

U.S. PATENT DOCUMENTS

| | | | |
|---|---|---|---|
| 9,088,606 | B2 | 7/2015 | Ranum et al. |
| 2008/0258880 | A1 | 10/2008 | Smith |
| 2011/0264608 | A1 | 10/2011 | Gonsalves et al. |
| 2015/0036922 | A1 | 2/2015 | El Dokor |
| 2015/0163242 | A1 | 6/2015 | Laidlaw et al. |
| 2015/0326600 | A1* | 11/2015 | Karabatis ............ H04L 63/1433 726/25 |
| 2015/0339570 | A1 | 11/2015 | Scheffler |
| 2015/0381649 | A1 | 12/2015 | Schultz et al. |
| 2016/0055334 | A1* | 2/2016 | Herwono ............ G06F 21/554 726/23 |
| 2016/0366126 | A1* | 12/2016 | Sharifi ................. H04L 63/083 |

FOREIGN PATENT DOCUMENTS

| | | | | |
|---|---|---|---|---|
| EP | 1093617 | A4 * | 1/2002 | ............ G06Q 30/02 |
| WO | 2000002138 | A1 | 1/2000 | |

OTHER PUBLICATIONS

PWC, Embedding cyber security into the energy ecosystem, An integrated approach to assessing cyber threats and protecting your assets, Feb. 2013.

Yang et al; Characterizing Cyber Attacks through Variable Length Markov Models, CMMC 2007.

Palmeri et al, Network anomaly detection through non linear analysis, computers & security 29 (2010) 737 e 755.

Anonymous, Analytic Forecasting of Future Electronic Cyber Threats with Deep Learning and Coevolutionary Strategies, Oct. 28, 2015.

Appendix P, Feb. 8, 2016.

* cited by examiner ion Ser. No. 15/019,073 entitled "FORECASTING AND
DETECTING AND PREDICTING CYBER-ATTACK PHASES IN ADJACENT DATA PROCESSING ENVIRONMENT REGIONS The present invention is related to similar subject matter of co-pending and commonly assigned U.S. patent application Ser. No. 15/019,073 entitled "FORECASTING AND CLASSIFYING CYBER-ATTACKS USING NEURAL EMBEDDINGS," filed on Feb. 9, 2016, which is hereby incorporated by reference.

TECHNICAL FIELD

The present invention relates generally to a method, system, and computer program product for predicting cyber attacks on data processing environments. More particularly, the present invention relates to a method, system, and computer program product for detecting and predicting cyber-attack phases in adjacent data processing environment regions.

BACKGROUND

Cyber-attack on a data processing environment is an unauthorized actual or potential exploitation, access, or use of a system or data contained in the data processing environment. A cyber-attack is also known as, or referred to as, a cyber threat, data breach, data security breach, system intrusion, malicious activity, and other similarly purposed terms. Generally, within this disclosure, any activity intended to cause harm to a system or data, or to cause harm using a system or data from a data processing environment is contemplated within the scope of "cyber-attack". "cyber-attack" is also interchangeably referred to herein as simple "attack" unless expressly distinguished where used.

Malicious computer-based intrusions against computing infrastructure in the United States are increasing by a significant order of magnitude. The value of the US intellectual property stolen or destroyed through cyber attacks potentially now exceeds one trillion dollars.

The steadily increasing cost and complexity of information systems, compounded by the growing volume, velocity, and diversity of information has created gaps and vulnerabilities in network defense systems. The number of cyber attacks within the United States alone hit an all-time high in 2014—over 750—in which an individuals' names and social security numbers, driver's license numbers, medical or financial records were stolen or compromised.

Natural language processing (NLP) is a technique that facilitates exchange of information between humans and data processing systems. For example, one branch of NLP pertains to transforming human readable content into machine usable data. For example, NLP engines are presently usable to accept input of unstructured data such as a record of human activity or conversation, and produce data, such as an outline of the input content, most significant and least significant parts, a subject, a reference, dependencies within the content, and the like, from the given content. NLP engines are also presently usable to accept input of structured data such as logs from data processing systems, and produce other data usable in other processes.

For example, another branch of NLP pertains to answering questions about a subject matter based on the information available about the subject matter domain. Such information may be the result of an NLP engine processing, for example, human communications, system logs, and the like. This is the branch of cognitive analytics, and is also referred to as a Question and Answer system (Q and A system). Cognitive analytics is the process of analyzing available information or knowledge to create, infer, deduce, or derive new information.

SUMMARY

The illustrative embodiments provide a method, system, and computer program product. An embodiment includes a method that selects, from a repository, a set of collections of forecasted feature vectors for a future time window after a present time, a cyber-attack being in progress in a data processing environment at the present time, a collection in the set having feature vectors that are indicative of an event related to the cyber-attack in a region of the environment at a discrete time. The embodiment selects, from the repository, a second set of collections of feature vectors where the feature vectors in a collection in the second set of collections are indicative of a second event in a second region of the environment. The embodiment inputs the set of collections at a first input in a Long Short-Term Memory (LSTM) network. The embodiment inputs the second set of collections at a second input in the LSTM network. The embodiment classifies the events corresponding to the collections in the set of collections into a class of cyber-attack. The embodiment determines, from a mapping between a set of phases of the cyber-attack and a set of classes, a phase that corresponds to the class. The embodiment predicts the determined phase as likely to occur during the future time window in the region.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
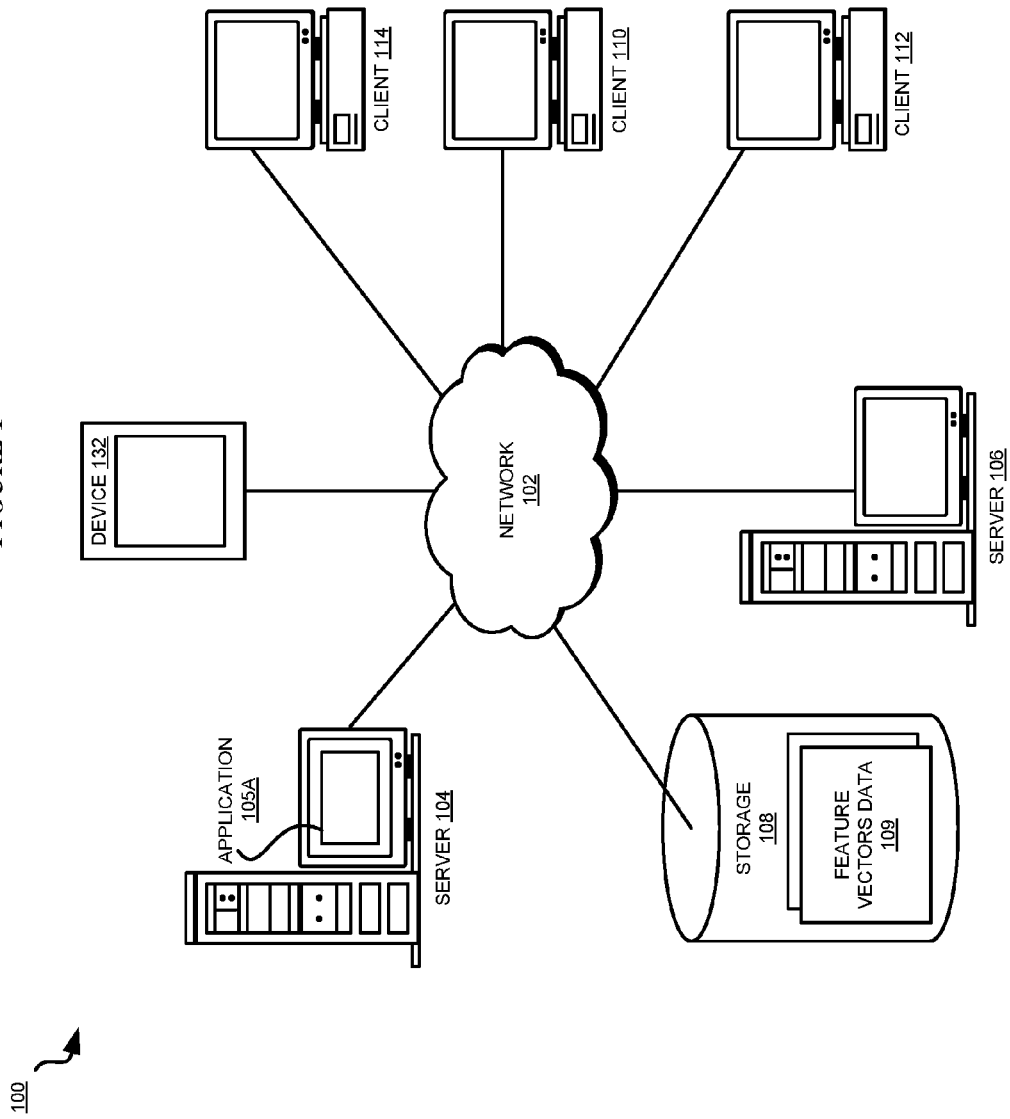
FIG. 1 depicts a block diagram of a network of data processing systems in which illustrative embodiments may be implemented.

The illustrative embodiments recognize that a cyber-attack generally progresses in stages or phases. A phase of a cyber-attack is a portion of the overall cyber-attack, where in the portion, the attacker accomplishes a part of the overall objective of the attack.

For example, to gain access to a power grid and disrupt the operations of a data processing system that controls power distribution over the grid, an attacker may have to gain unauthorized access to a firewall, collect data that is used in the power distribution programming, replace the data with malicious data, hide the unauthorized access from detection, and hide the malicious data. Each of these example operations, e.g., the unauthorized access, or the malicious data insertion, or the obfuscation, and others, are a phase in the cyber-attack.

Different cyber-attacks can have different objectives, and can use different phases in different orders. Different cyber-attacks can also repeat a phase different number of times.

The illustrative embodiments recognize that presently, cyber-attack detection typically occurs in the later phases of an attack, after attackers have already gained privileged access or otherwise completed at least some phases of the attack. Even when it is performed, the analysis of cyber-attacks often happens only in a post-mortem manner.

The illustrative embodiments recognize that determining the attack type and origin before a data processing environment is compromised is a problem of high value and complexity that remains unsolved. The illustrative embodiments recognize that effective mitigation of cyber-attacks requires that an attack be detected early, and real-time analysis be executed at machine speeds to identify the completed phases of the attack, the current phase of the attack, and to predict a future phase of the attack.

The illustrative embodiments further recognize that a data processing environment has regions. For example, the external facing firewall and related logic or systems may form one region, the data storage logic and systems form another region, the logic and systems to control the operations form another region, the logic and systems to manage and administrate the data processing environment form another region, and so on.

Different data processing environments can have different regions into which the logic and the systems operating in the data processing environment can be divided. One region in a data processing environment can have one or more other adjacent regions. The adjacency of a region to another region is logical adjacency, i.e., a region is said to be adjacent to another region when regardless of the physical proximity of the two regions, a logical operation performs one operation using the logic and systems in one region and performs a next operation using logic and systems in the other region.

The illustrative embodiments recognize that a cyber-attack progresses from region to region within a data processing environment to achieve its objective. An attack may progress from one region to an adjacent region, or to a non-adjacent remote region. As in the above example, an attack might begin with an unauthorized access phase in the region that includes the firewall, progress to malicious data access or insertion phase in the data storage region, to malicious data execution in the operations region, to obfuscation in the administration region. The storage region may be adjacent to the firewall region in this ordering of the phases for this example attack, but may be distant from the firewall region in another ordering of the phases of a different attack.

The illustrative embodiments used to describe the invention generally address and solve the above-described problems and other problems related to region-wise detection and prediction of the phases of an ongoing present cyber-attack in a data processing environment.

An embodiment can be implemented as a software application. The application implementing an embodiment can be configured as a modification of an existing cyber security application, as a separate application that operates in conjunction with an existing cyber security application, a stand-alone application, or some combination thereof.

The illustrative embodiments recognize that a typical cyber-attack has some combination of the following phases:

1. Reconnaissance: Before launching an attack, hackers first identify a vulnerable target and explore possible ways to exploit it. The initial target can be anyone or any system in an organization, whether an executive or an admin, whether a firewall or a mail-server. The attackers simply need a single point of entrance to get started. As an example, targeted phishing emails are common in this step, as an effective method of distributing malware.

2. Scanning: Once the target is identified, the next step is to identify a weak point that allows the attackers to gain access. This is usually accomplished by scanning an organization's network—with tools easily found on the Internet—to find entry points. This process is usually slow, sometimes lasting months.

3. Access and Escalation: When a weakness in the target network is identified, the next step in the cyber-attack is to gain access and escalate. In almost all such cases, privileged access is necessary because it allows the attackers to move freely within the environment. Rainbow tables, and similar tools, help intruders steal credentials, escalate privileges to admin, and then continue into any system on the network that is accessible via the administrator account. In summary, once the attackers gain elevated privileges, the network is effectively taken over and is now "owned" by the intruders.

4. Exfiltration: With the freedom to move around the network, the attackers can now access systems with an organization's most sensitive data and extract it at will. In addition to stealing private data, intruders can change or erase files on compromised systems.

5. Sustainment: The attackers have now gained unrestricted access throughout the target network. Next is sustainment, or staying in place quietly. To accomplish this the hackers may install malicious programs like rootkits that allow them to maintain access and obfuscate their presence. With the elevated privileges acquired earlier, dependence on a single point of entry is no longer required. The attackers can come and go as they please using one or more points or systems in the data processing environment.

6. Assault: Fortunately, this step is not taken in every cyber-attack, because the assault is the stage of an attack when the attackers actions become particularly malicious. This is when the hackers might alter the functionality of the victim's hardware, or disable the hardware entirely. The Stuxnet attack on Iran's critical infrastructure is a classic example. During the assault phase, the attack ceases to be stealth. However, the attackers have already effectively taken control of the environment, so it is generally too late for the breached organization to defend itself.

7. Obfuscation: Usually the attackers want to hide their tracks, but this is not universally the case—especially if the hackers want to leave a "calling card" behind to boast about their exploits. The purpose of trail obfuscation is to confuse, disorientate, and divert the forensic examination process. Trail obfuscation covers a variety of techniques and tools including log cleaners, spoofing, misinformation, backbone hopping, zombie accounts, Trojan commands, and more.

The illustrative embodiments further recognize that a phase of a cyber-attack can be regarded as a cyber-attack of a particular class in its own right. The illustrative embodiments recognize that some non-limiting example classes for classifying cyber-attacks—and by extension phases of a cyber-attack—include—

1. Data destruction—this class of cyber-attack or phase is where existing data in a system is destroyed or made unusable.

2. Data theft—this class of cyber-attack or phase is where existing data in a system is copied or exported from the system.

3. Malicious code—this class of cyber-attack or phase is where logic for causing attacker-specified operations is inserted into the data processing environment.

4. Unauthorized access—this class of cyber-attack or phase is where access to a system is gained without permission from a legitimate administrating authority of the system.

5. Denial of service—this class of cyber-attack or phase is where access to, or capability of, a system or service is slowed or disrupted.

6. Port scanning—this class of cyber-attack or phase is where an attacker explores a system to identify a weakness, vulnerability, unguarded access, or exploitable behavior of the system.

These examples of seven example phases and the six example classes of attack are not intended to be limiting. From this disclosure, those of ordinary skill in the art will be able to conceive many other phases and classes, or differently define a phase or a class, and such variations are contemplated within the scope of the illustrative embodiments.

A collection of vectors, to wit, an organism having ($U_t$, $V_t$, $W_t$) chromosomes, or ($U_t$, $W_t$) chromosomes, or ($V_t$, $W_t$) chromosomes, corresponds to a specific time. With the scope of the illustrative embodiments a slot is a time window for which a set of collections (organisms) corresponding to different times within the time window—in a sliding window fashion—is available form a region of a data processing environment. In other words, a collection corresponds to a discrete time T1 within a slot, then a sliding window slides to time T2 with in the slot where another collection corresponds to T2, and so on.

The slot can be a past time window, a time window including the current or present time, or a future time window. A collection or organism from a time window is indicative of a set of events that have transpired, are transpiring, or are likely to transpire, during a discrete time in the corresponding past, present, or future time window in the region. In other words, a collection (organism) is evidence of events corresponding to a time in a given slot.

According to the illustrative embodiments, the evidence in a slot is a set of collections, which is evidence of a phase of a cyber-attack. Therefore, the set of collection is referred to herein as cyber phase slot evidence (CPSE).

The CPSE is usable to identify a phase of a cyber-attack in the corresponding slot (also referred to as a cyber phase slot or strata). In one embodiment, the stratification is performed by Deep Belief Networks (DBN) comprising feed forward neural networks, which are trained on several types of cyber attacks. After the cyber phase slot has been filled—i.e., the phase of the cyber-attack (cyber phase) of a slot has been identified—one embodiment uses a Long Short Term Memory network (LSTM) to classify the phase of an attack in a region. An LSTM network is an artificial neural network that contains LSTM blocks instead of, or in addition to, regular network units. An LSTM block may be described as a "smart" network unit that can remember a value for an arbitrary length of time. An LSTM block contains gates that determine when the input is significant enough to remember, when it should continue to remember or forget the value, and when it should output the value.

The set of events in a region is influenced by the events in another region, such as, but not limited to, in an adjacent region. Accordingly, a vector (e.g., a $U_t$ vector or a $V_t$ vector or a $W_t$ vector) corresponding to a slot in one region can affect or alter a meaning of a vector (e.g., a $U_t$ vector or a $V_t$ vector or a $W_t$ vector) corresponding to the same slot or a different slot in another region.

To classify the phase of an attack in one region, another embodiment further uses the CPSE of another region, such as but not necessarily an adjacent region, as an additional input into the LSTM to classify the phase of an attack in the region. Long term memory is maintained over time with respect to the collections (organisms) of the various regions in the data processing environment.

A method of an embodiment described herein, when implemented to execute on a device or data processing system, comprises substantial advancement of the functionality of that device or data processing system towards detecting the past and present phases of a present cyber-attack and towards predicting future cyber-attacks in regions of a data processing environment. For example, presently available methods for detecting cyber attacks are limited to reacting to an attack that either has already occurred or is in progress but such methods cannot determine which phase the attack is in, what might happen next in the attack, or which region the future phase of attack might attack. An embodiment provides a method by which existing data in a data processing environment can be used to analyze and identify the phases and regions through which a cyber-attack has progresses up to a point in time, and predict a future phase of the cyber-attack and a future region in the data processing environment that might be affected in the ongoing attack. This manner of detecting and predicting cyber-attack phases in adjacent data processing environment regions is unavailable in the presently available methods. Thus, a substantial advancement of such devices or data processing systems by executing a method of an embodiment is in proactively defending against future phases of a cyber threat that have not yet materialized in a data processing environment.

The illustrative embodiments are described with respect to certain types of data, vectors, collections or organisms, numbers and types of vectors or chromosomes, DBN or LSTM types of networks, training method of a network, slots, phases of a cyber-attack, class or types of attacks or phases, regions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
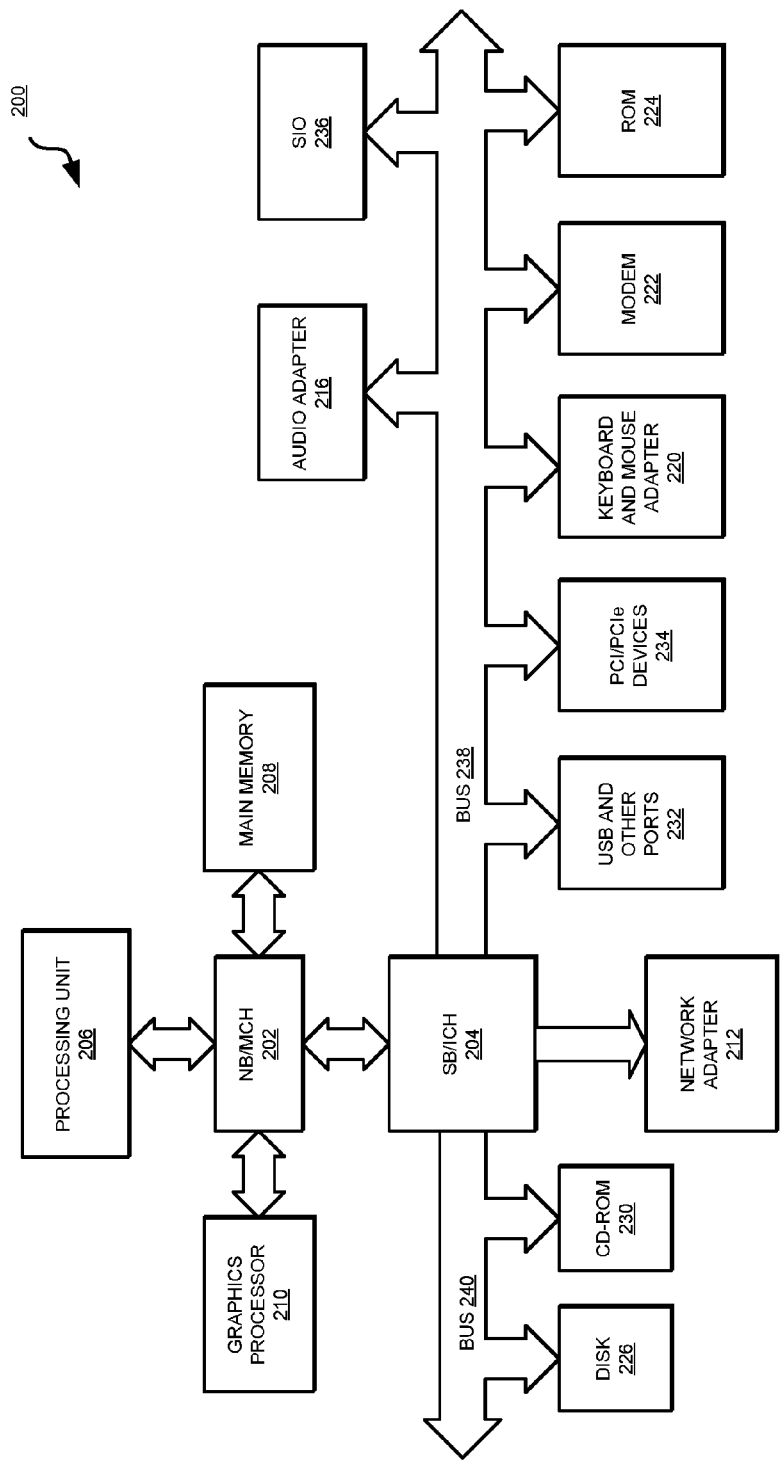
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105A implements an embodiment described herein. Data 109 is example feature vector data ($U_t$, $V_t$, $W_t$, or some combination thereof) of a number of collections (organisms), for one or more discrete times, in one or more slots, and from one or more regions in data processing environment 100, and is usable in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
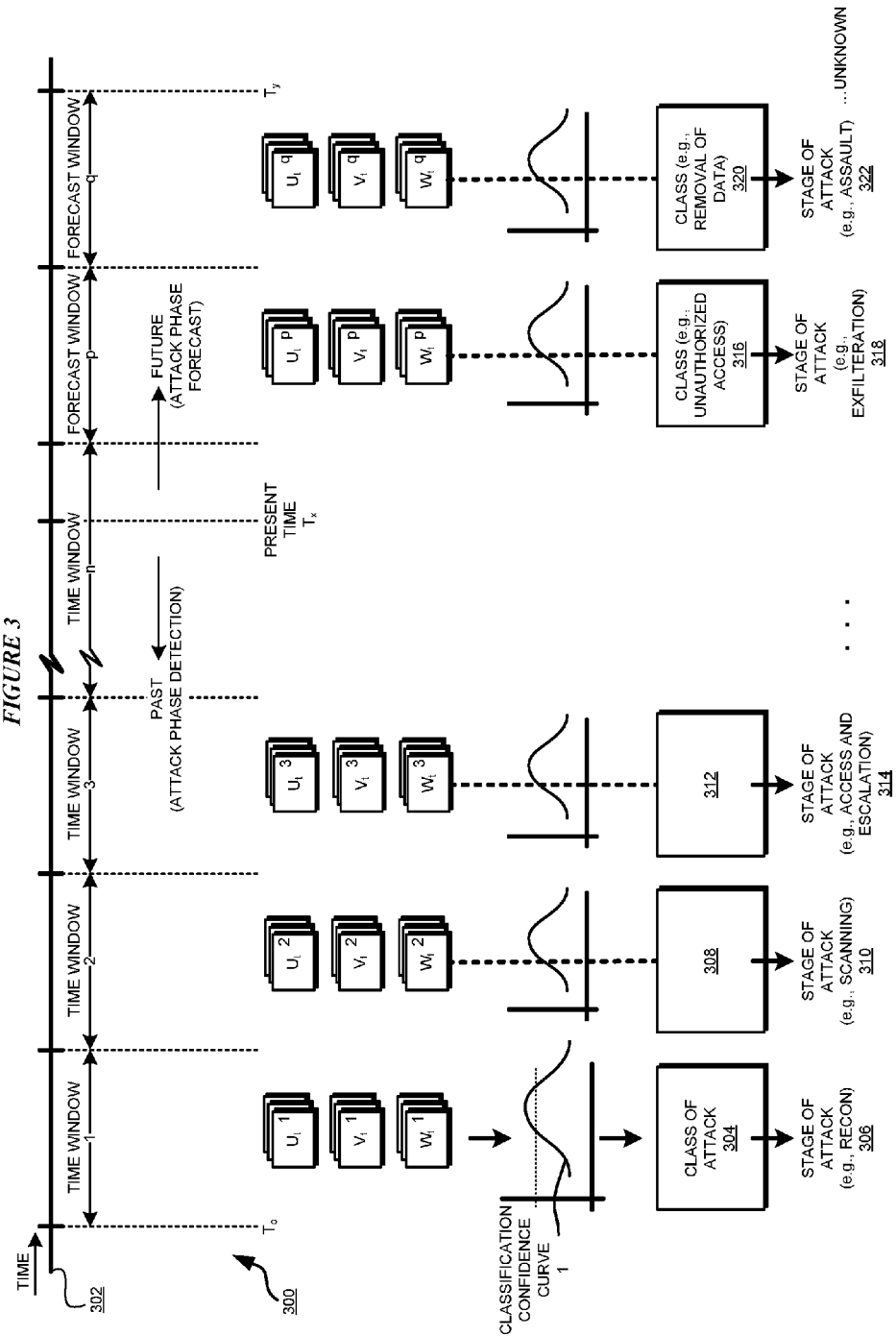
FIG. 3 depicts a block diagram of an example process for detecting and predicting cyber-attack phases in adjacent data processing environment regions in accordance with an illustrative embodiment.

With reference to FIG. 3, this figure depicts a block diagram of an example process for detecting and predicting cyber-attack phases in adjacent data processing environment regions in accordance with an illustrative embodiment. Process 300 can be implemented in application 105A in FIG. 1.

Timeline 302 is an example timeline along which a present cyber-attack is progressing in a given data processing environment. The present time on timeline 302 is $T_x$. T0 is as far back in time as a given implementation of an embodiment can analyze, given the amount of vector data 109 that might be available in the environment.

As a non-limiting example, and only for illustration purposes, assume that the collections available for any discrete time in any time window (slot) in the data processing environment include the $U_t$, $V_t$, and $W_t$ vectors. One or more collections of $(U_t^1, V_t^1, W_t^1)$ are available for one or more discrete times in past time window 1 beginning at time $T_0$ as shown. Similarly, one or more collections of $(U_t^2, V_t^2, W_t^2)$ are available for one or more discrete times in past time window 2; one or more collections of $(U_t^3, V_t^3, W_t^3)$ are available for one or more discrete times in past time window 3, and so on until the present time $T_x$. One or more collections with forecasted vectors are also computed and stored in data 109. For example, one or more collections of $(U_t^p, V_t^p, W_t^p)$ are available for one or more discrete times in future time window p; and one or more collections of $(U_t^q, V_t^q, W_t^q)$ are available for one or more discrete times in past time window q; with forecasted vector data beyond time $T_y$ being unreliable or unavailable.

When a collection is analyzed to classify the type of cyber-attack indicated by the collection, the confidence in that classification can change depending upon where in the time window the discrete time of the collection lie, and on the events that are transpiring in the region at that time. As a simple non-limiting example, assume that a phase of a cyber-attack exhibits the simple characteristic of starting slowly, then peaking, and then waning until another phase starts slowly. Furthermore, for the clarity of the description, assume that process 300 is occurring in a single region of a data processing environment; and a single phase is operative at one time.

Thus, a set of collections $(U_t^1, V_t^1, W_t^1)$ at different times in time window 1 will have different confidence levels to indicate a corresponding class of attack, which, in a simple case, might appear to follow curve 1. Using curve 1 or another similarly purposed analysis of the set of collections $(U_t^1, V_t^1, W_t^1)$, such as in a DBN, an embodiment identifies class of attack 304 that appears to have occurred during time window 1. Based on class 304, the embodiment identifies phase or stage 306 of attack that has occurred in time window 1.

Operating in a similar manner, and by performing similar analyses on the sets of collections $(U_t, V_t, W_t)$ associated with the various time windows, the embodiment identifies class 308 and corresponding phase 310 that appears to have occurred during time window 2; class 312 and corresponding phase 314 that appears to have occurred during time window 4; and so on until present time $T_x$.

Similarly, by performing similar analyses on the sets of collections $(U_t, V_t, W_t)$ predicted for one or more future time windows, the embodiment identifies class 316 and corresponding phase 318 that is likely to occur during forecasted time window p; and class 320 and corresponding phase 322 that that is likely to occur during forecasted time window q; and so on until time $T_y$ beyond which the forecasted vectors are not reliable or available for classification and phase prediction.

In one embodiment, the phase detection or prediction begins with the farthest time window in the future for which predicted vector data is available, and moves backwards in time to the vector data available for the oldest actual historical time window. For example, such an embodiment begins the analysis in time window q, identifies class 320 as a 'removal of data' class, and outputs phase 322 as an 'assault' phase of the attack. Next in this example, the embodiment identifies class 316 as an 'unauthorized access' class, and outputs phase 318 as an 'exfilteration' phase of the attack. Progressing backwards along timeline 302 in this manner, the embodiment outputs phase 314 (e.g., 'access and escalation' phase), phase 310 (e.g., 'scanning' phase), and phase 306 (e.g., 'reconnaissance' phase), etc.

Figure 4:
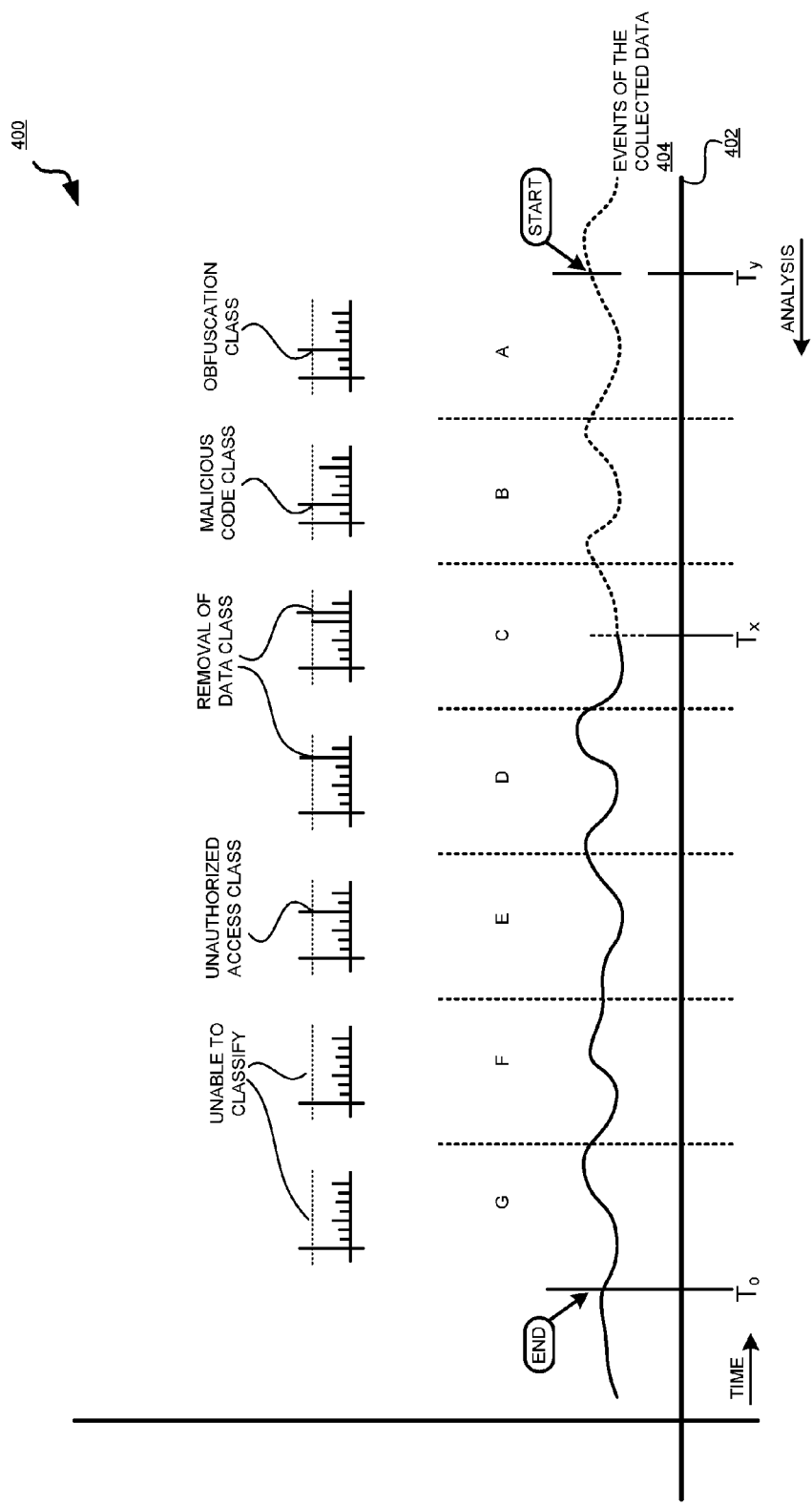
FIG. 4 depicts an example manner of processing vector data for phase detection and prediction in accordance with an illustrative embodiment.

With reference to FIG. 4, this figure depicts an example manner of processing vector data for phase detection and prediction in accordance with an illustrative embodiment. As an example, process 400 can be implemented in application 105A of FIG. 1, which uses an LSTM network for phase determination.

Again assume that a present cyber-attack is progressing along timeline 402. The present time is $T_x$, the farthest forecast is available until time $T_y$, and the farthest time in the past for the analysis is set at $T_0$. Line 404 is representative of the events transpiring in the region for which the past cyber phases have to be identified and future cyber phases have to be predicted. The solid portion of line 404 indicates actual events, the dotted portion of line 404 indicates predicted events as they transpire in slots (time windows) A, B, C, D, E, F, and G.

An embodiment begins the analysis at slot A and ends at slot G. The CPSE for slot A, i.e., the vector data for time window A is provided as an input to an LSTM that has been trained to detect and classify cyber-attacks. Suppose, as a non-limiting example, that the LSTM network is trained to recognize seven classes, indicated by seven bars in each graph shown in each slot. As depicted, given the CPSE for a particular slot, the LSTM network produces an output such that at least one of the answers of the LSTM network as to the seven example classes can be regarded as a definitive output of the LSTM network. Of course more than one answers can be definitive as well. In one example embodiment, a level of an output exceeding a threshold (indicated by the dotted line parallel to the X axis of each graph in each slot) is indicative of definiteness of the LSTM's answer.

For example, the LSTM determines that the CPSE for slot A indicates that an attack phase of the 'obfuscation class' will likely be underway during slot A. Likewise, the LSTM determines that the CPSE for slot B indicates that an attack phase of the 'malicious code class' will likely be underway during slot B.

Operating in a similar manner, the LSTM determines that the CPSE for slots C and D indicate that an attack phase of the 'removal of data class' was operated during slot D and will likely be underway during slot C and continue through the present time $T_x$ in slot C. The LSTM determines that the CPSE for slot E indicates that an attack phase of the 'unauthorized access class' was executed in slot E. As an example, farther back in time from slot E, e.g., in slots F and G, the LSTM may indicate that the detection is unreliable or the LSTM is unable to classify the data to identify a phase.

Figure 5:
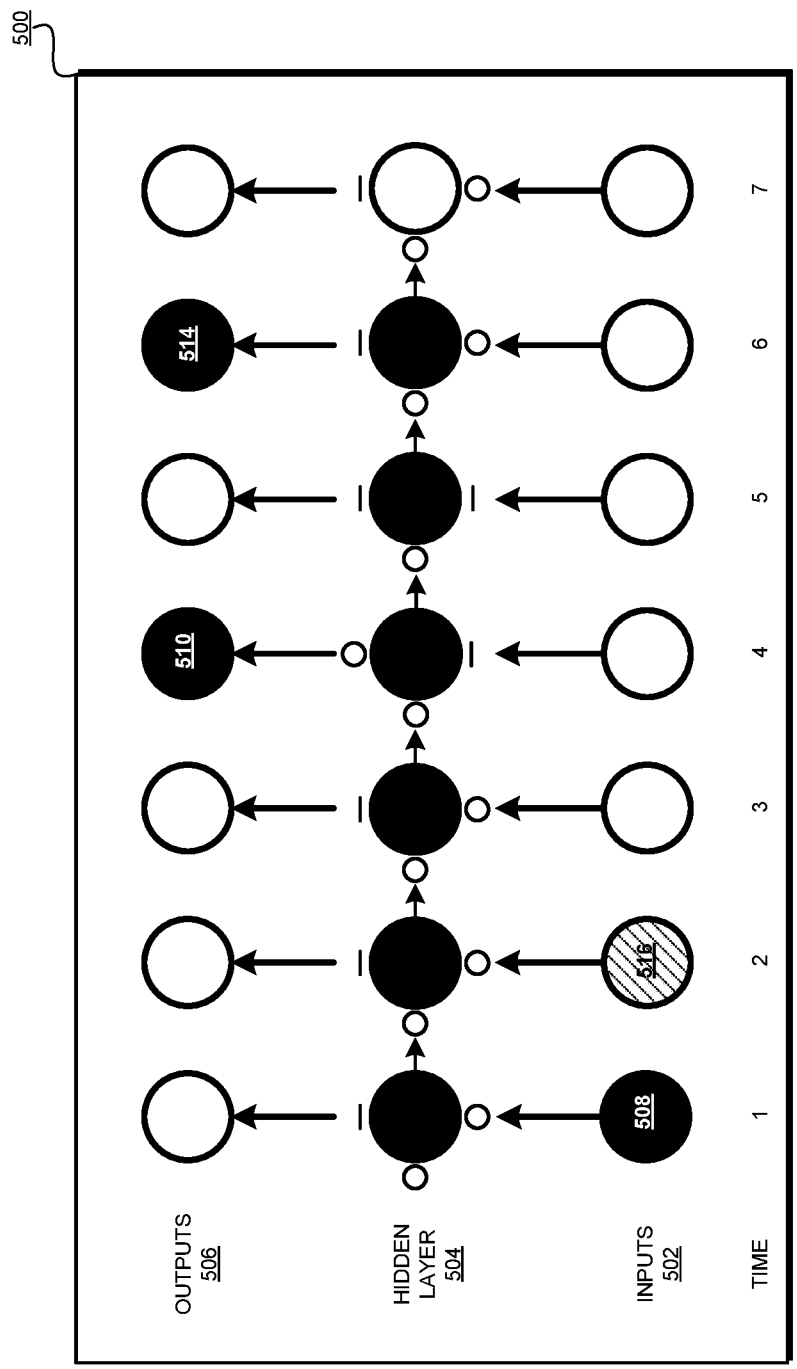
FIG. 5 depicts a block diagram of an LSTM network usable for detecting and predicting cyber-attack phases in adjacent data processing environment regions in accordance with an illustrative embodiment.

With reference to FIG. 5, this figure depicts a block diagram of an LSTM network usable for detecting and predicting cyber-attack phases in adjacent data processing environment regions in accordance with an illustrative embodiment. LSTM 500 is configured for use with application 105A, such as on one or more machines (not shown) operating in data processing environment 100 in FIG. 1.

An embodiment, implemented in application 105A, provides one or more inputs at the input blocks 502. LSTM 500 includes hidden layer 504, which is a neural network of a suitable type, configured with a weight matrix that are tuned according to the training of the hidden layer. LSTM 500 produces one or more outputs 506 in response to the one or more inputs 502.

Assume that the time markers 1-7 depicted below inputs 502 signifies slots. The darkened circles in input 502 represent the presence of an input, which is the CPSE for a region for that corresponding slot. The darkened circles in hidden layer 504 denote the processing and are only examples in this figure—not indicative of any particular processing by any particular part of the neural network. The darkened circles in outputs 506 are indicative of the presence of a definitive output, e.g., an output with a value that exceeds a threshold value.

In a first example operation, the embodiment applies the CPSE of a first region to input 502 at time 1 (i.e., to input block 508). LSTM 500 produces outputs 510 and 514, indicating two possible classifications. The two possible classifications can mean the same phase or different phases depending on a particular implementation, definitions used, and training applied to LSTM 500.

In a second example operation, the embodiment applies the CPSE of a first region to input 502 at time 1 (i.e., to input block 508) and the CPSE of another region to input 516 at time 2. In doing so, the embodiment is attempting to determine an effect of the events occurring in the other region at time 2 on the events occurring in the first region at time 1.

In some cases, this application of additional regional CPSE can help disambiguate LSTM 500's response, e.g., by removing output 514 and only producing output 510. In some other cases, this application of additional regional CPSE can help reinforce LSTM 500's response, e.g., by continuing to produce outputs 510 and 514. In some other cases, this application of additional regional CPSE can cause a change in LSTM 500's response, e.g., by producing a different output (not shown) than outputs 510 and 514.

Any number of regional CPSE inputs can be applied for any number of time slots at any time distance from a region and slot whose phase is to be determined. Generally, the higher the number of inputs, the higher the amount of training that is needed for reliable outputs from LSTM 500. Given the technological limitations of a particular implementation of LSTM 500, the implementation of an embodiment can select a suitable number of regional inputs for which LSTM 500 is trained and can produce reliable output(s) in a reasonable amount of time.

For a region, whether determined in isolation for the region or by incorporating the effects of other regions on the region, the phase in a slot forms one value in a phase slot evidence vector. A phase slot evidence vector is a vector formed of various phases in different time windows according to the corresponding evidence. Thus a phase slot evidence vector shows the phases of attack that a region passes through over time.

Figure 6:
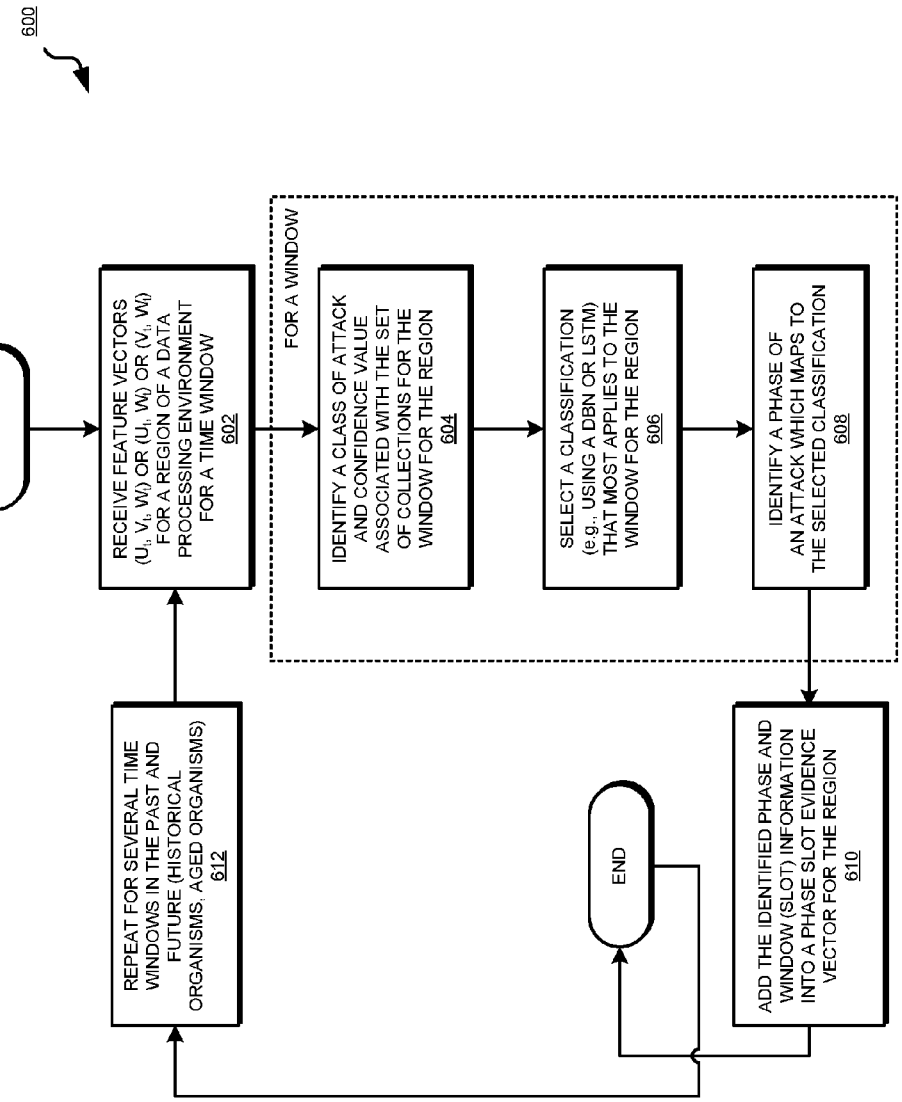
FIG. 6 depicts a flowchart of an example process for detecting and predicting cyber-attack phases in adjacent data processing environment regions in accordance with an illustrative embodiment.

With reference to FIG. 6, this figure depicts a flowchart of an example process for detecting and predicting cyber-attack phases in adjacent data processing environment regions in accordance with an illustrative embodiment. Process 600 can be implemented in application 105A in FIG. 1.

The application receives, for a region of a data processing environment, a set of collection of feature vectors for discrete times in a time window (block 602). For the time window, the application identifies a class of attach and confidence value associated with the set of collections for the region for the window (block 604). The application selects a classification, e.g., by using a DBN or an LSTM as described herein, that most applies to the window for the region (block 606). The application identifies a cyber phase that maps to the selected classification (block 608). The application adds the identified phase, slot (time window), information into a phase slot evidence vector for the region (block 610).

The application repeats blocks 602-610 for each past slot and future slot for which historical organisms and aged organisms, respectively, are available in a repository (block 614). The application ends process 600 thereafter.

Figure 7:
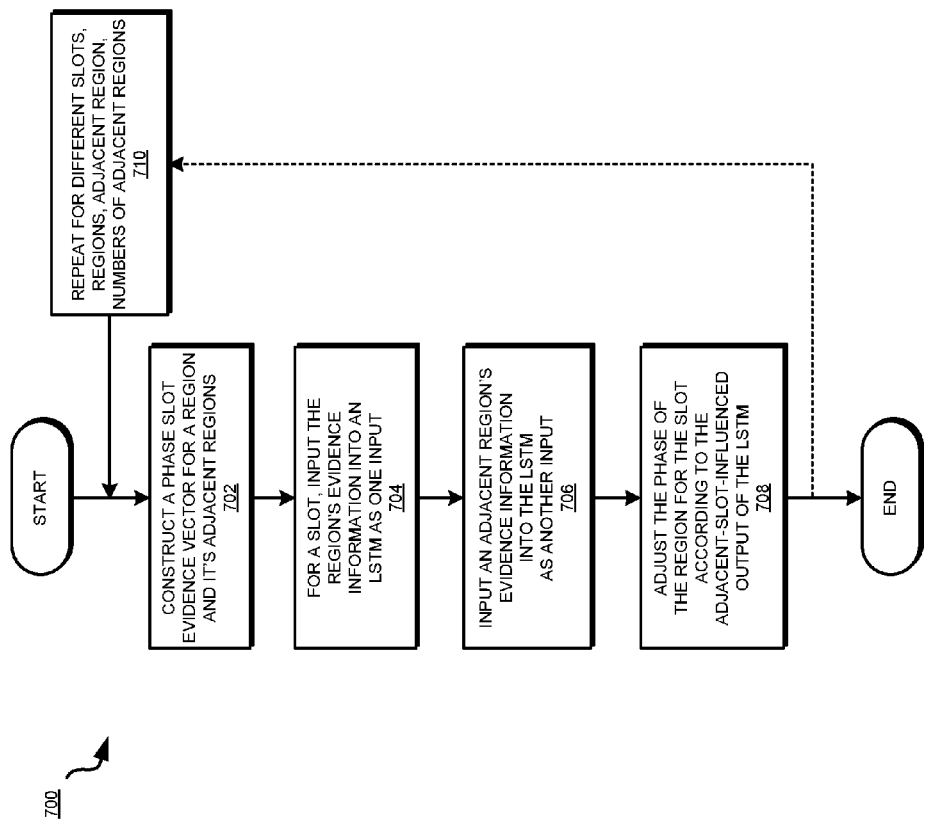
FIG. 7 depicts depicts a process for predicting a phase of a cyber-attack in an adjacent region in accordance with an illustrative embodiment.

With reference to FIG. 7, this figure depicts a process for predicting a phase of a cyber-attack in an adjacent region in accordance with an illustrative embodiment. Process 700 can be implemented in application 105A in FIG. 1.

Process 700 is depicted as a special scenario, where region 1 is adjacent to region 2, region 1 is experiencing a phase of a cyber-attack, and the objective is to predict a phase that will likely be experienced by region 2. The adjacent regions are not intended to be limiting. From this disclosure, those of ordinary skill in the art will be able to adapt process 700 to situations where region 1 and region 2 are not adjacent but distant from one another and removed by intermediate regions. Such adaptations are contemplated within the scope of the illustrative embodiments.

The application constructs a phase slot evidence vector for a region and its adjacent regions (block 702). For a slot, the application inputs the region's evidence information into an LSTM as a first input (block 704). The application inputs an adjacent region's evidence information into an LSTM as a first input (block 706). In one embodiment, the adjacent regions' evidence is for the same slot. In another embodiment, the adjacent region's evidence is for a different slot.

The LSTM outputs a class of attack, which indicates the phase of attack in the region, as influenced by the events transpiring in the adjacent region. The application adjusts or records the phase according to the LSTM output in the region's phase slot evidence vector (block 708).

The application repeats blocks 702-708 for different slots, regions, adjacent region(s), number(s) of adjacent regions, or some combination thereof (block 710). The application ends process 700 thereafter.

Thus, a computer implemented method, system or apparatus, and computer program product are provided in the illustrative embodiments for detecting and predicting cyber-attack phases in adjacent data processing environment regions. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   selecting, from a repository, a set of collections of forecasted feature vectors for a future time window after a present time, a cyber-attack being in progress in a data processing environment at the present time, a collection in the set having feature vectors that are indicative of an event related to the cyber-attack in a region of the environment at a discrete time;

selecting, from the repository, a second set of collections of feature vectors where the feature vectors in a collection in the second set of collections are indicative of a second event in a second region of the environment;

inputting the set of collections at a first input in a Long Short-Term Memory (LSTM) network;

inputting the second set of collections at a second input in the LSTM network;

classifying the events corresponding to the collections in the set of collections into a class of cyber-attack;

determining, from a mapping between a set of phases of the cyber-attack and a set of classes, a phase that corresponds to the class; and predicting the determined phase as likely to occur during the future time window in the region.

2. The method of claim 1, wherein the second event has actually occurred in the second region at a second discrete time.

3. The method of claim 1, wherein the second event is forecasted to occur in the second region at a second discrete time.

4. The method of claim 1, wherein the second event occurs in the second region at the discrete time.

5. The method of claim 1, further comprising:
selecting, from the repository, a past set of collections of actual feature vectors for a past time window before the present time, a cyber-attack being in progress in a data processing environment during the past time window, a collection in the past set having feature vectors that are indicative of a past event related to the cyber-attack in the region of the environment a past discrete time;

classifying the events corresponding to the collections in the past set into a past class of cyber-attack;

determining, from the mapping, a past phase that corresponds to the past class; and outputting the determined past phase as having occurred during the past time window in the region.

6. The method of claim 5, wherein the classifying into the past class occurs after the classifying into the future class.

7. The method of claim 1, wherein in the mapping, a plurality of classes in the set of classes map to a single phase in the set of phases.

8. The method of claim 1, further comprising:
determining the class such that the class applies to the time window beyond a threshold amount of fit.

9. The method of claim 8, wherein the threshold amount of fit is a threshold value of an output of the LSTM network.

10. The method of claim 1, wherein each collection in the set of collection indicates an event at a different discrete time in the future time window.

11. The method of claim 1, wherein the second event alters the event.

12. A computer program product comprising one or more computer-readable storage devices, and program instructions stored on at least one of the one or more storage devices, the stored program instructions comprising:

program instructions to select, from a repository, a set of collections of forecasted feature vectors for a future time window after a present time, a cyber-attack being in progress in a data processing environment at the present time, a collection in the set having feature vectors that are indicative of an event related to the cyber-attack in a region of the environment at a discrete time;

program instructions to select, from the repository, a second set of collections of feature vectors where the feature vectors in a collection in the second set of collections are indicative of a second event in a second region of the environment;

program instructions to input the set of collections at a first input in a Long Short-Term Memory (LSTM) network;

program instructions to input the second set of collections at a second input in the LSTM network;

program instructions to classify the events corresponding to the collections in the set of collections into a class of cyber-attack;

program instructions to determine, from a mapping between a set of phases of the cyber-attack and a set of classes, a phase that corresponds to the class; and program instructions to predict the determined phase as likely to occur during the future time window in the region.

13. The computer program product of claim 12, wherein the second event has actually occurred in the second region at a second discrete time.

14. The computer program product of claim 12, wherein the second event is forecasted to occur in the second region at a second discrete time.

15. The computer program product of claim 12, wherein the second event occurs in the second region at the discrete time.

16. The computer program product of claim 12, further comprising:

program instructions to select, from the repository, a past set of collections of actual feature vectors for a past time window before the present time, a cyber-attack being in progress in a data processing environment during the past time window, a collection in the past set having feature vectors that are indicative of a past event related to the cyber-attack in the region of the environment a past discrete time;

program instructions to classify the events corresponding to the collections in the past set into a past class of cyber-attack;

program instructions to determine, from the mapping, a past phase that corresponds to the past class; and program instructions to output the determined past phase as having occurred during the past time window in the region.

17. The computer program product of claim 16, wherein the program instructions to classify into the past class are configured to execute after the program instructions to classify into the future class.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to select, from a repository, a set of collections of forecasted feature vectors for a future time window after a present time, a cyber-attack being in progress in a data processing environment at the present time, a collection in the set having feature vectors that are indicative of an event related to the cyber-attack in a region of the environment at a discrete time;

program instructions to select, from the repository, a second set of collections of feature vectors where the feature vectors in a collection in the second set of collections are indicative of a second event in a second region of the environment;

program instructions to input the set of collections at a first input in a Long Short-Term Memory (LSTM) network;

program instructions to input the second set of collections at a second input in the LSTM network;

program instructions to classify the events corresponding to the collections in the set of collections into a class of cyber-attack;

program instructions to determine, from a mapping between a set of phases of the cyber-attack and a set of classes, a phase that corresponds to the class; and program instructions to predict the determined phase as likely to occur during the future time window in the region.

* * * * *